No. 763,796. PATENTED JUNE 28, 1904.
G. R. RICH.
CHUCK.
APPLICATION FILED MAY 18, 1903.
NO MODEL.

Witnesses:
Russell Wiles
Chas. O. Shurvey

Inventor:
George R. Rich,
by H. Betner
Atty.

THE NORRIS PETERS CO., PHOTO-LITHO., WASHINGTON, D. C.

No. 763,796. Patented June 28, 1904.

UNITED STATES PATENT OFFICE.

GEORGE R. RICH, OF CHICAGO, ILLINOIS, ASSIGNOR TO THE GEO. R. RICH MANUFACTURING COMPANY, OF CHICAGO, ILLINOIS, A CORPORATION OF ILLINOIS.

CHUCK.

SPECIFICATION forming part of Letters Patent No. 763,796, dated June 28, 1904.

Application filed May 18, 1903. Serial No. 157,540. (No model.)

*To all whom it may concern:*

Be it known that I, GEORGE R. RICH, a citizen of the United States of America, residing at Chicago, in the county of Cook and State of Illinois, have invented certain new and useful Improvements in Chucks, of which the following is a specification.

My invention relates to certain new and useful improvements in chucks. Its object is to produce a device of this class which shall have certain advantages of construction and operation not possessed by those heretofore in use.

To this and certain minor ends my invention consists in certain novel features of construction, which are clearly illustrated in the accompanying drawings and described in the following specification.

Figure 1:
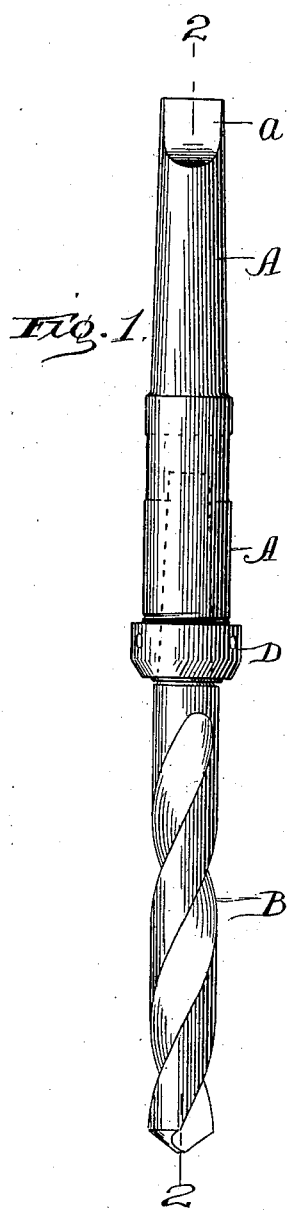
Figure 3:
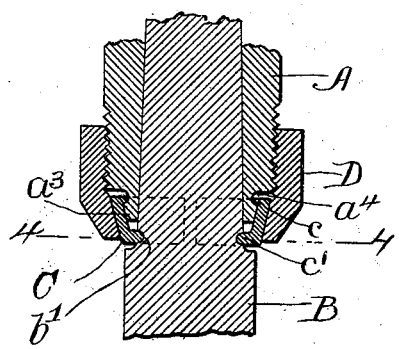
Figure 2:
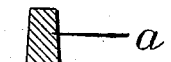
Figure 4:
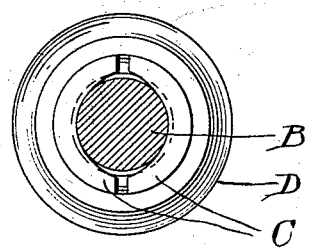
Figure 5:
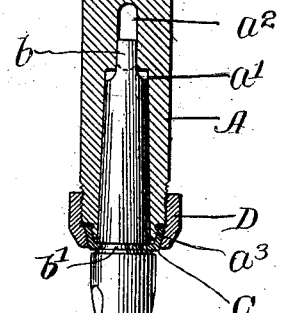
Figure 5:
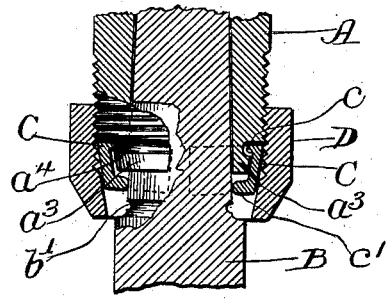
Figure 6:
Figure 6:

In the aforesaid drawings, Figure 1 is an elevation of my improved chuck, showing the drill in place. Fig. 2 is a longitudinal section taken in the line 2 2 of Fig. 1, the drill, however, being shown in elevation. Fig. 3 is an enlarged detail section of the lower end of the chuck, showing the manner of securing the drill in place, the section also being in the line 2 2 of Fig. 1. Fig. 4 is a cross-section in the line 4 4 of Fig. 3 looking upward. Fig. 5 is a section in the same plane as Fig. 3, a portion of the drill and lower end of the chuck being shown in side elevation, the nut being partly unscrewed and the drill slightly removed from the chuck; and Fig. 6 is a perspective of one of the halves of the locking-bushings.

Referring to the drawings, A is the body of the chuck, which is provided with a tapered shank $A'$, terminating in a flat end $a$, this tapered shank and flattened end being adapted to be inserted in the spindle of an ordinary drill-press. The body A is bored out to form a conical socket $a'$, which terminates at its upper end in a flat transversely-extending slot $a^2$, which is adapted to receive the upper flattened end $b$ of the shank of a drill B. The lower end of the body A is externally screw-threaded to receive a nut D and beyond this screw-thread is reduced in diameter, forming a conical-shaped end $a^3$, having a circumferential groove $a^4$ therein. A split bushing C is provided, which surrounds said reduced conical portion $a^3$. Each of said halves C of this bushing is provided with two inwardly-extending circumferential beads $c$ $c'$, the bead $c$ resting in the circumferential groove $a^4$ and the bead $c'$ being adapted to engage the circumferential groove $b'$ provided in the drills B, which are used in connection with my improved chuck. The beads $c$ do not fit the grooves $a^4$ in the chuck, but have considerable play therein, the object of which will appear later in the course of this specification.

It will be noted that the bushing formed by the two halves when placed together is frustoconical in form. The nut D is formed with a conical interior surface, which engages with the conical outer face of the bushing and forces the two halves thereof toward each other as the nut is screwed upon the body of the chuck. This nut may be provided with suitable holes for engagement with a spanning-wrench or it may be hexagonal for engagement with a wrench or other tool and for screwing it upon the chuck.

In using this chuck the shank of the drill is inserted in the socket $a'$, with the flattened upper end in the slot provided for it. When thus in position, the bead $c'$ upon the bushing engages with the groove upon the shank of the drill, and the upper end of the shank fits snugly into the conical socket of the drill. The nut D is screwed up upon the end of the chuck, bringing the two halves of the bushing together and locking the beads $c$ in the circumferential groove of the chuck. This exerts a direct lateral clamping pressure upon the drill from the bushings, so that the bushing may be said to be locked to the drill, forming a vise therefor. As the nut D is screwed up farther the bushings move up a slight distance, the play of the bead $c$ in the groove $a^4$ permitting this movement. This movement of the bushing forces the upper end of the drill into the conical socket provided for it and wedges it firmly in place, so that not only is a direct lateral pressure produced, but a pressure upward into the tapered socket. This upward pressure is particularly desirable upon a drill having a tapered shank, for the reason that a much stronger and firmer clamping pressure can be obtained than in any other way, and to obtain this pressure it is necessary that the beads $c$ have a limited play in the grooves with which it engages. The bushings are held in place by engagement of the beads $c$ with the groove in the reduced portion $a^3$ of the body of the chuck. With these upper beads in the corresponding groove on the body of the chuck absent the bushings would merely follow the nut downward as it was unscrewed without getting out of the groove $b'$ in the drill, and consequently it would be necessary to turn the chuck upside down to remove the drill. With the structure as it is, however, the bushings are held in place so as to be capable of considerable separation, but of very slight longitudinal movement.

The particular advantage of this chuck lies in the fact that the drill is positively held in place instead of being merely wedged in and held by friction alone, as has heretofore been customary. Where drills are only wedged in place in the chuck and no special means is provided to secure them, they occasionally become loosened, so as to play vertically to a limited extent, after which the flat upper end, which prevents relative rotation between the chuck and the drill, rapidly wears off, permitting the drill to turn freely in the chuck.

I realize that considerable variations are possible in the details of this construction without departing from the spirit of the invention, and I therefore do not intend to limit myself to the specific form herein shown and described, except as pointed out in the claims.

I claim as new and desire to secure by Letters Patent—

1. The combination with the body of a chuck adapted to receive a drill provided with a circumferential groove, of a split bushing provided with a bead adapted to enter the groove on said drill, a nut adapted to bring said bushing into contact with said drill, and a second bead upon said bushing adapted to enter a corresponding groove on said body, whereby longitudinal movement of said bushing away from said body is limited.

2. The combination with the body of a chuck having a circumferential groove and adapted to receive a drill provided with a circumferential groove, of a split bushing provided with a bead to enter the groove on said drill, a nut adapted to bring said bushing into contact with said drill and a second bead upon said bushing adapted to enter the groove on said body, the groove upon said body being slightly larger than said bead and adapted to permit a limited longitudinal movement of the bushing.

In witness whereof I have signed the above application for Letters Patent, at Chicago, in the county of Cook and State of Illinois, this 11th day of May, A. D. 1903.

GEORGE R. RICH.

Witnesses:
RUSSELL WILES,
CHAS. O. SHERVEY.